(No Model.)
S. W. TOBEY.
MILK COOLER.
No. 478,482. Patented July 5, 1892.
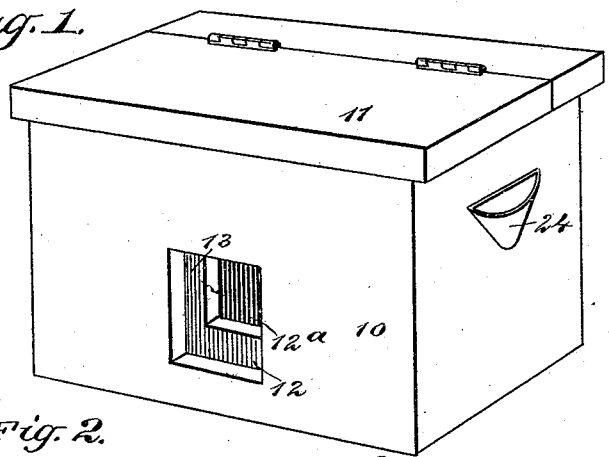
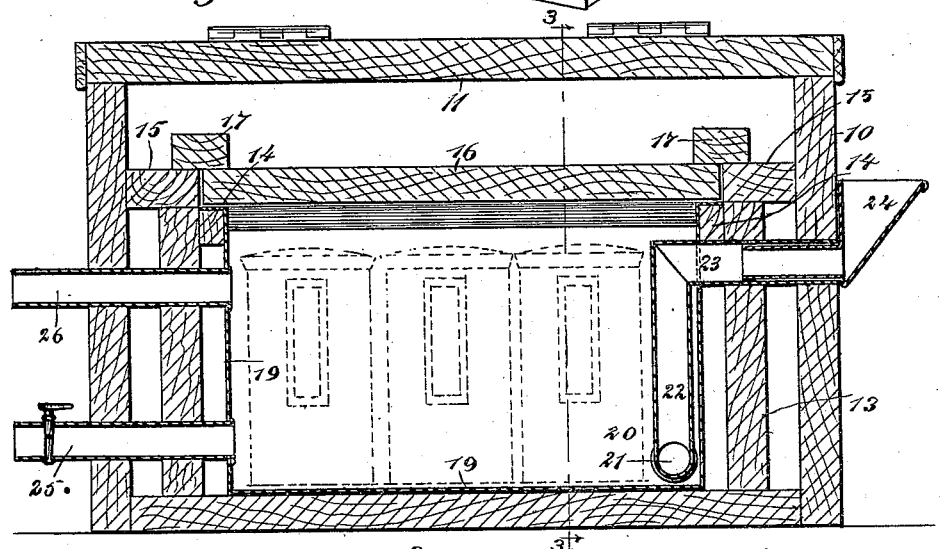
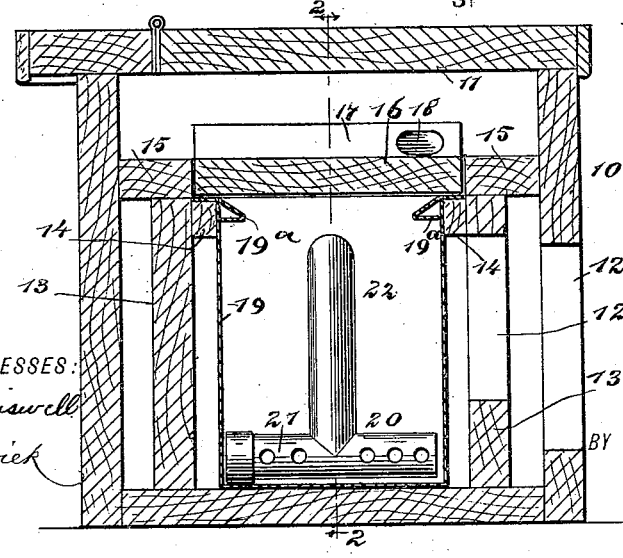
WITNESSES:
INVENTOR
S. W. Tobey
BY
Munn & Co
ATTORNEYS,
THE NORRIS PETERS CO., PHOTO-LITHO., WASHINGTON, D. C.

UNITED STATES PATENT OFFICE.

SAMUEL W. TOBEY, OF FAIRFIELD, NEBRASKA, ASSIGNOR TO HIMSELF AND C. J. FURER, OF SAME PLACE.

MILK-COOLER.

SPECIFICATION forming part of Letters Patent No. 478,482, dated July 5, 1892.

Application filed September 7, 1891. Serial No. 404,933. (No model.)

*To all whom it may concern:*

Be it known that I, SAMUEL W. TOBEY, of Fairfield, in the county of Clay and State of Nebraska, have invented a new and Improved Milk-Cooler, of which the following is a full, clear, and exact description.

My invention relates to improvements in milk-coolers, such as are adapted to hold milk when set for cream; and the object of my invention is to produce a convenient cooler in which the milk may be easily inserted and removed, which will serve to cool the milk from the bottom toward the top, thus insuring the rapid rise of cream, and which is constructed in such a way that the cream cannot be contaminated.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a perspective view of the cooler. Fig. 2 is an enlarged longitudinal section of the same on the line 2 2 in Fig. 3, and Fig. 3 is a vertical cross-section on the line 3 3 in Fig. 2.

The cooler is provided with an exterior box 10, forming the cooler-frame, and this has a swinging cover 11, which enables the interior to be easily reached. The box 10 has also an opening 12 in one side and within the box is another smaller box 13, arranged so that there will be an air-space between it and the outer box, and this box has also an opening 12ª opposite the opening 12 in the outer box. The top portions of the inner box are secured to cross-strips 14, which strengthen the inner box and form a support for the water-tank, and the air-space between the two boxes is closed at the top by the strips 15, which strips also serve as a guide for the removable cover 16 of the inner box and tank, which cover has cross-end strips 17, in which are hand-holes 18, which facilitate the removal of the cover.

Within the inner box 13 is a water-tank 19, which is preferably made of sheet metal—such as galvanized iron—and this tank is held in place by means of top flanges, which rest upon the strips 14. The tank has also along the top sides inclined flanges 19ª, which cause any water precipitated on the cover 16 to drain off into the tank. The tank 19 is adapted to contain the cans of milk, as indicated by dotted lines in Fig. 2, and in one end of the tank is a T-pipe 20, the horizontal portion 21 of which extends transversely across the tank and is provided with a series of holes, so that the water may be delivered to the tank throughout its entire width, and the vertical portion 22 of the pipe terminates at its upper end in an outward bend 23, which projects through the walls of the cooler, and is provided at its outer end with a funnel 24, in which the water is poured to fill the tank. At the opposite end of the tank are outlet-pipes 25 and 26, the pipe 25 being arranged near the bottom and the pipe 26 near the top, and the pipe 25 is kept closed except when the water is to be withdrawn from the tank, but the pipe 26 is left open and serves as an overflow-pipe.

In practice the outside cover 11 is raised and the inner cover 16 removed and then the milk-cans are placed in the tank 19, the covers are replaced, and sufficient water to fill the tank is poured into the funnel 24, and, if convenient, running water may be allowed to pass through the tank. The cool water as it enters the tank will strike the bottoms of the cans, thus cooling the bottom portion of the milk first, so as to insure a rapid rise of cream, and the warmer water will flow off through the pipe 26.

It will be noticed that provision is made for a free circulation of air around the tank and that there is no chance for any impure air to come in contact with the milk or cream.

Having thus fully described my invention, I claim as new and desire to secure by Letters Patent—

1. A milk-cooler comprising a double-walled box having suitable covers, a tank arranged centrally within the box, an inlet-pipe having its inner end arranged transversely in the tank-bottom and provided with a series of holes and its outer end provided with a funnel, an outlet-pipe adjacent to the tank-bottom, and an overflow-pipe adjacent to the tank-top, substantially as described.

2. A milk-cooler consisting of an inner and outer box having an air-space between them and each provided with a registering opening in one side and with covers, an inlet-pipe having a T-shaped and apertured portion on the inside of the tank at the bottom thereof, and discharge and overflow pipes leading from the tank out through the boxes, substantially as herein shown and described.

SAMUEL W. TOBEY.

Witnesses:
CHARLES J. FURER,
SAML. C. THOMPSON.